(12) United States Patent
Kang et al.

(10) Patent No.: US 7,447,006 B2
(45) Date of Patent: Nov. 4, 2008

(54) MONITOR

(75) Inventors: Suk-jo Kang, Seongnom-si (KR);
Jae-soo Sim, Suwon-si (KR); Doo-won Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 457 days.

(21) Appl. No.: 11/124,105

(22) Filed: May 9, 2005

(65) Prior Publication Data
US 2005/0248912 A1    Nov. 10, 2005

(30) Foreign Application Priority Data
May 8, 2004    (KR) .................. 10-2004-0032510

(51) Int. Cl.
*G06F 1/16* (2006.01)

(52) U.S. Cl. ................. 361/683; 361/681; 16/231; 16/319

(58) Field of Classification Search ......... 361/679–683; 248/917–923; 16/231, 319, 326, 343–345
See application file for complete search history.

(56) References Cited

U.S. PATENT DOCUMENTS

| | | | | |
|---|---|---|---|---|
| 5,812,368 | A * | 9/1998 | Chen et al. ................. | 361/681 |
| 6,421,878 | B1 | 7/2002 | Kaneko et al. | |
| 6,539,582 | B1 * | 4/2003 | Chae .......................... | 16/340 |
| 6,666,422 | B1 * | 12/2003 | Lu et al. ................. | 248/291.1 |
| 6,813,813 | B2 * | 11/2004 | Lu et al. .................... | 16/342 |
| 6,859,356 | B2 * | 2/2005 | Chih et al. ................. | 361/681 |
| 6,912,120 | B2 * | 6/2005 | Kim et al. ................... | 361/681 |
| 2004/0012917 | A1 * | 1/2004 | Jung et al. ................. | 361/681 |
| 2004/0211866 | A1 * | 10/2004 | Jung et al. ................. | 248/133 |
| 2005/0002159 | A1 * | 1/2005 | Jeong ......................... | 361/683 |

FOREIGN PATENT DOCUMENTS

JP    2002-106542    4/2002

(Continued)

OTHER PUBLICATIONS

PCT Search Report issued on Jan. 25, 2005, for PCT/KR2005/000204.

*Primary Examiner*—Jayprakash N Gandhi
*Assistant Examiner*—Anthony Q Edwards
(74) *Attorney, Agent, or Firm*—Stanzione & Kim, LLP (57) ABSTRACT

A monitor including a monitor main body, a stand supporting the monitor, and a link connecting the monitor main body with the stand, the monitor including a hinge allowing the monitor main body to be tilted about the stand between a first tilting state such as a standing state and a second tilting state such as a wall-mounting state; a locking unit provided in the hinge, rotating integrally with the monitor main body, and including a first locker corresponding to the first tilting state and a second locker corresponding to the second tilting state; and a stopper coupled to the link, sliding within the first locker and the second locker, and restricting a tilting angle of the monitor main body by contacting the first locker and the second locker. With this configuration, the present general inventive concept provides a monitor of which a monitor main body is smoothly and easily tilted about a stand between a standing state and a wall-mounting state.

19 Claims, 9 Drawing Sheets

FOREIGN PATENT DOCUMENTS

| | | |
|---|---|---|
| JP | 2003-280533 | 10/2003 |
| JP | 2003-348495 | 12/2003 |
| JP | 2004-56802 | 2/2004 |
| KR | 20-0212515 | 11/2000 |
| KR | 20-0258355 | 12/2001 |
| KR | 20-0270429 | 3/2002 |
| KR | 20-0316596 | 6/2003 |
| KR | 20-0326992 | 9/2003 |

* cited by examiner

MONITOR

CROSS-REFERENCE TO RELATED APPLICATIONS

This application claims the benefit of Korean Patent Application No. 2004-32510, filed May 8, 2004, in the Korean Intellectual Property Office, the disclosure of which is incorporated herein by reference.

BACKGROUND OF THE INVENTION

1. Field of the Invention

The present general inventive concept relates to a monitor, and more particularly, to a monitor having an improved structure to readily tilt a monitor main body.

2. Description of the Related Art

Generally, a monitor comprises a monitor main body, a stand seated on an installation surface and supporting the monitor main body, and a hinge rotatably connecting the monitor main body with the stand at a predetermined angle.

There has recently been produced a monitor compatible between a standing type and a wall-mounting type. As an example, there is a monitor disclosed in Korean Utility Model No. 0347325.

Such a conventional monitor comprises a monitor main body; a stand; a hinge connecting the monitor main body with the stand rotatably between a standing state and a wall-mounting state; first and second stoppers provided in the stand; a first locker provided in the monitor main body and restricting a tilting angle of the monitor main body between the first and second stoppers in the standing state; and a second locker locked to the first stopper in the wall-mounting state and restricting the tilting angle of the monitor main body, wherein at least one of the first and second lockers is made of a resilient material.

With this configuration of the conventional monitor, the tilting angle of the monitor main body can be adjusted in both the standing state and the wall-mounting state.

However, a recent tendency is toward a large-sized monitor. In the case of the large-sized monitor, if a large-sized monitor main body is still operated by resilience of the conventional locker or stopper, not only is there a requirement for a large amount of force in order to tilt the large-sized monitor main body, but also the large-sized monitor main body is not smoothly tilted.

SUMMARY OF THE INVENTION

Accordingly, it is an aspect of the present general inventive concept to provide a monitor of which a monitor main body is smoothly and easily tilted about a stand between a standing state and a wall-mounting state.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a monitor comprising a monitor main body, a stand supporting the monitor, and a link connecting the monitor main body with the stand, the monitor comprising: a hinge allowing the monitor main body to be tilted about the stand between a first tilting state such as a standing state and a second tilting state such as a wall-mounting state; a locking unit provided in the hinge, rotating integrally with the monitor main body, and comprising a first locker corresponding to the first tilting state and a second locker corresponding to the second tilting state; and a stopper coupled to the link, sliding within the first locker and the second locker, and restricting a tilting angle of the monitor main body by contacting the first locker and the second locker.

According to an aspect of the present general inventive concept, the locking unit may comprise a rotatable washer coupled to the hinge and rotating integrally with the monitor main body, and the first and second lockers are grooved with predetermined lengths on the rotatable washer, respectively.

According to an aspect of the present general inventive concept, the monitor may further comprise a stopper operator provided in the stand, connected to the stopper, and operating the stopper to slide toward an inside of the link.

According to an aspect of the present general inventive concept, the stand may comprise a link accommodating portion to accommodate the link; and a cover provided corresponding to the link accommodating portion, covering the link accommodating portion, and provided with the stopper operator.

According to an aspect of the present general inventive concept, the cover may be formed with an operator insertion portion in which the stopper operator is inserted, and the stopper operator comprises a pushing portion exposed to an outside of the cover, a stopper contacting portion extending from the pushing portion to an inside of the cover and partially contact-supporting the stopper, and a hook preventing the stopper operator from separating from the operator insertion portion.

According to an aspect of the present general inventive concept, the stopper may comprise a connection portion provided inside the link and contacting the stopper operator, and a sliding portion outwardly bent from an end of the connection portion and sliding outside of the link.

According to an aspect of the present general inventive concept, the link may comprise a sliding through portion at a lateral side thereof, and a supporter and a slope portion at the inside thereof, the sliding through portion allowing the sliding portion to slide therethrough; the supporter supporting the stopper; and the slope portion allowing the stopper to slide therealong.

BRIEF DESCRIPTION OF THE DRAWINGS

The above and/or other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
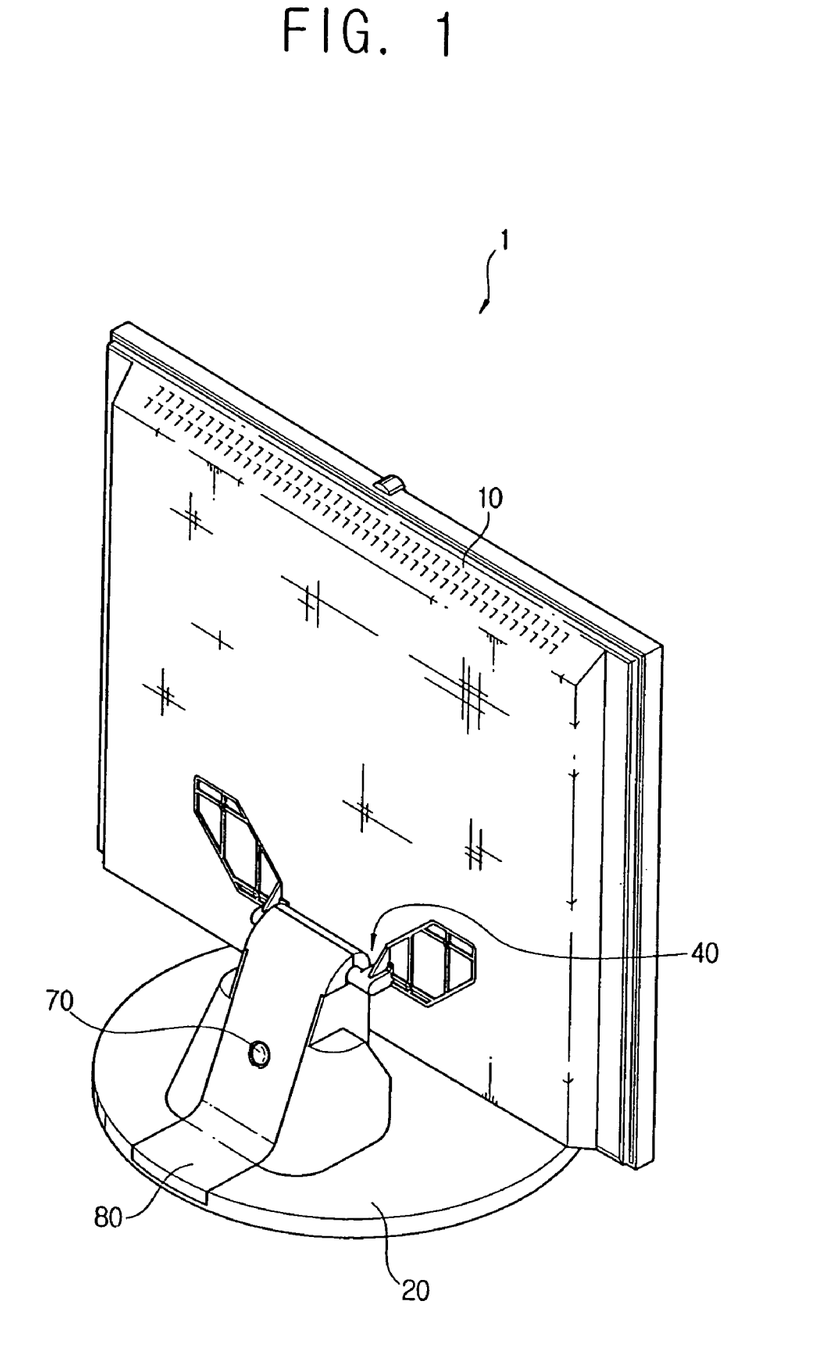
FIG. 1 is a rear perspective view of a monitor according to an embodiment of the present general inventive concept.
Figure 2:
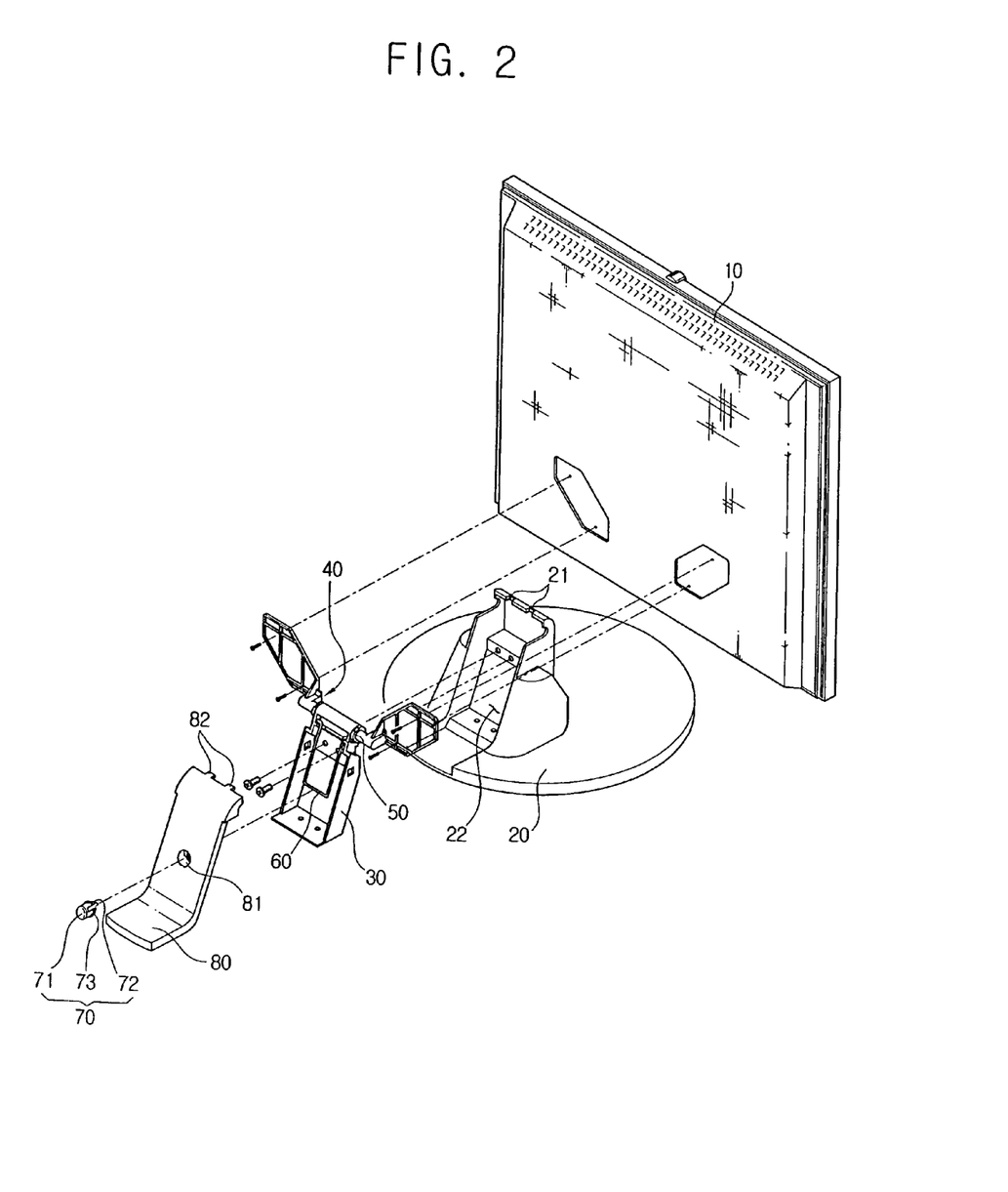
FIG. 2 is a rear exploded perspective view of the monitor of FIG. 1.
Figure 3:
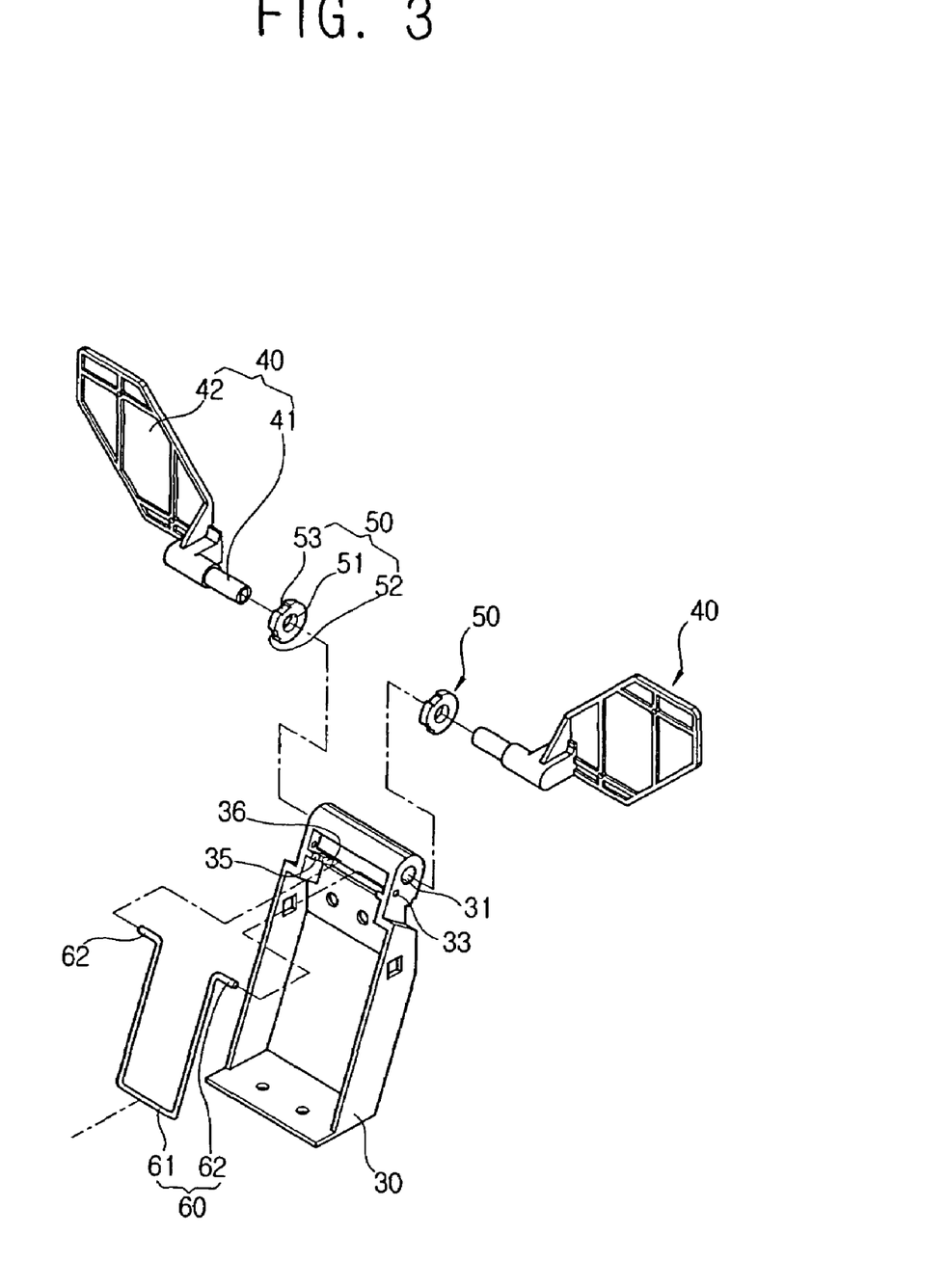
FIG. 3 is an exploded perspective view of a portion in the monitor of FIG. 1.

As shown in FIGS. 1 through 3, a monitor 1 according to an embodiment of the present general inventive concept comprises a monitor main body 10 displaying a picture, a stand 20 coupled to and supporting the monitor main body 10, a link 30 provided in the stand 20 and linking the monitor 10 with the stand 20, and a hinge 40 connecting the monitor main body 10 with the stand 20 rotatably at a predetermined angle.

Here, the monitor main body 10 is tilted about the stand 20 between a first tilting state and a second tilting state, wherein the first tilting state indicates that the monitor main body 10 stands on a predetermined installation surface and the second tilting state indicates that the monitor main body 10 is mounted onto a wall. Thus, the monitor 1 further comprises a locking unit 50 rotating integrally with the monitor main body 10, and a stopper 60 coupled to the link 30 and restricting a tilting angle of the monitor main body 10 by engaging with the locking unit 50. Here, the locking unit 50 comprises a first locker 52 corresponding to the first tilting state, and a second locker 53 corresponding to the second tilting state.

The stand 20 is seated on the installation surface, and comprises a link accommodating portion 22 formed in a rear portion of the stand 20 and accommodating the link 30; and a cover 80 covering the link accommodating portion 22 in which the link 30 is accommodated. The stand 20 is formed with a coupling groove 21 at an upper portion thereof to be coupled with the cover, and the cover 80 is formed with a coupling projection 82 corresponding to the coupling groove 21 and fitted in the coupling groove 21.

The link 30 has a lower portion coupled to the link accommodating portion 22 formed in the stand 20 by a screw (not shown), and an upper portion connected to the monitor main body 10 by the hinge 40. Further, the upper portion of the link 30 is penetratingly formed with a hinge hole 31 to which a hinge shaft 41 (to be describe later) is rotatably inserted.

The hinge 40 rotatably supports the monitor main body 10 to be tilted between the first tilting state and the second tilting state. The hinge 40 comprises the hinge shaft 41 rotatably coupled to the link 30, and a hinge bracket 42 extending from the hinge shaft 41 and coupled to rear opposite sides of the monitor main body 10 to support the monitor main body 10.

The locking unit 50 may comprise a rotatable washer coupled to the hinge shaft 41 and integrally rotating along a rotational direction of the monitor main body 10.

The locking unit (rotatable washer) 50 is formed with a shaft hole 51 in which the hinge shaft 41 is fitted and integrally rotates with the shaft hole 51. Thus, the hinge shaft 41 is integrally fitted in the shaft hole 51 and rotatably inserted in the hinge hole 31. Further, on an outer circumference of the locking unit (rotatable washer) 50 are formed the first locker 52 locked to the stopper 60 in the standing state of the monitor main body 10, and the second locker 53 locked to the stopper 60 in the wall-mounting state of the monitor main body 10.

The first locker 52 and the second locker 53 are grooved on the outer circumference of the locking unit (rotatable washer) 50 with predetermined arc lengths, respectively. Thus, the tilting angle of the monitor main body 10 is restricted in both the first tilting state and the second tilting state according to the arc lengths of the first locker 52 and the second locker 53, respectively.

Figure 4:
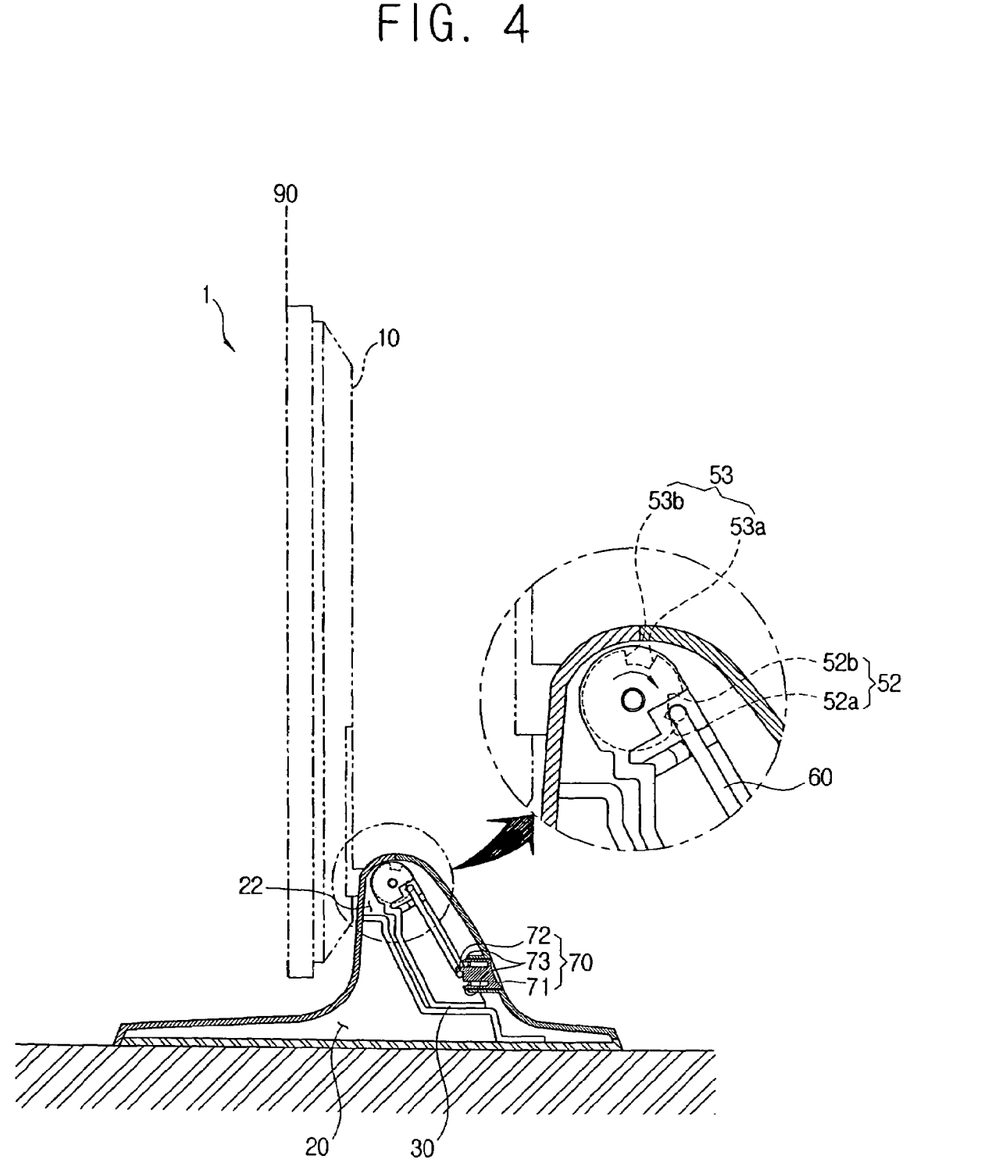
FIG. 4 is a lateral section view of a monitor according to an embodiment of the present general inventive concept, of which a monitor main body is tilted at an angle of 0° in a first tilting state.
Figure 5:
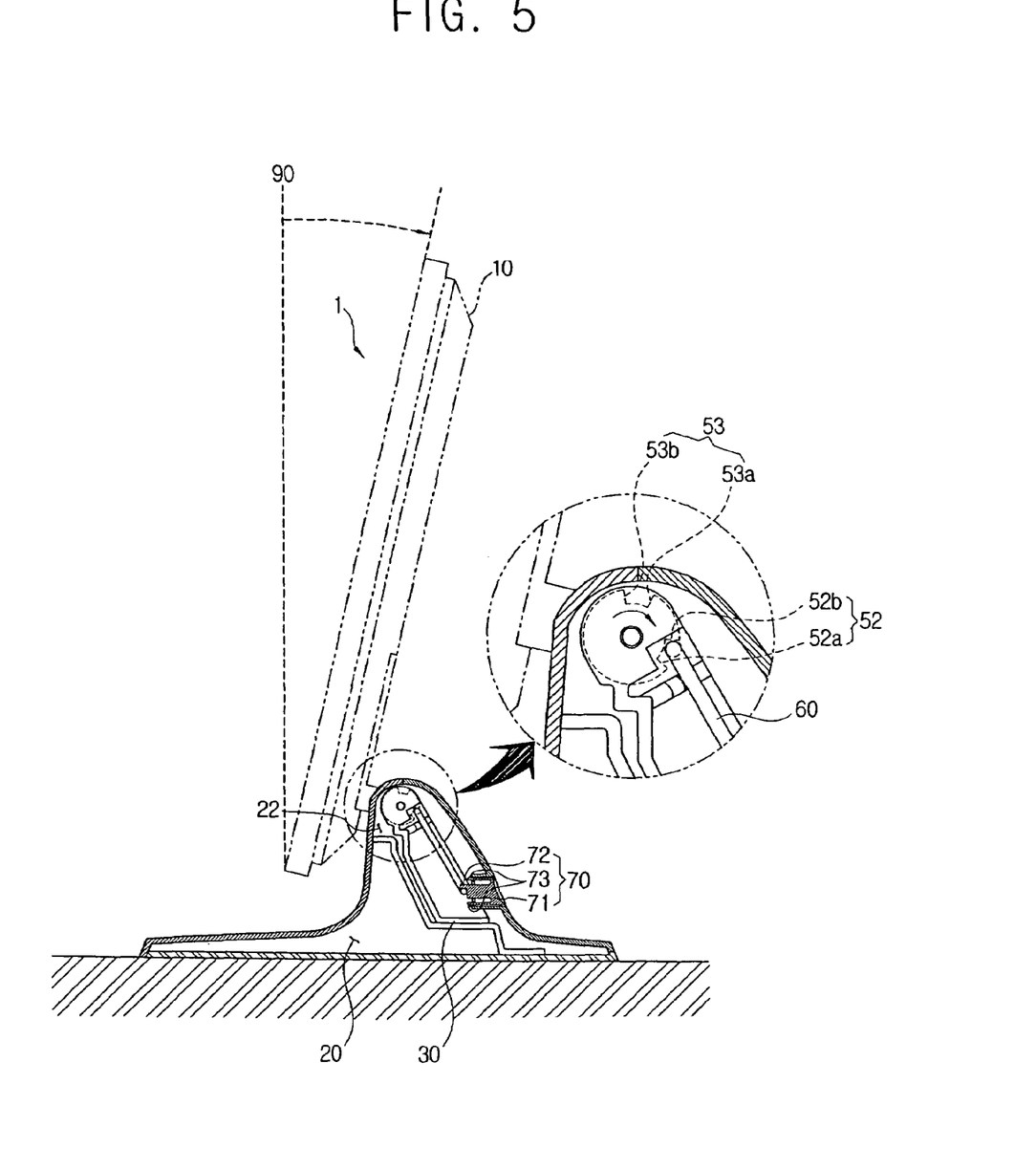
FIG. 5 is a lateral section view of the monitor of FIG. 4, of which the monitor main body is tilted at an angle of 13° in the first tilting state.

Referring to FIG. 4, the first locker 52 comprises a first edge 52a and a second edge 52b, wherein the first and second edges 52a and 52b engage with the stopper 60 in the first tilting state and restrict the tinting angle of the monitor main body 10 within a range from 0° to 13° with respect to a first reference line 90. That is, as shown in FIG. 4, when the stopper 60 is in contact with the first edge 52a, the monitor main body 10 is tilted at an angle of 0° with respect to a first reference line 90. Further, as shown in FIG. 5, when the monitor main body 10 is tilted backward, the locking unit (rotatable washer) 50 rotates integrally with the monitor main body 10 with respect to the hinge shaft 41 until the second edge 52b contacts the stopper 60. At this time, the monitor main body 10 is tilted at an angle of 13° with respect to the first reference line 90.

Figure 7:
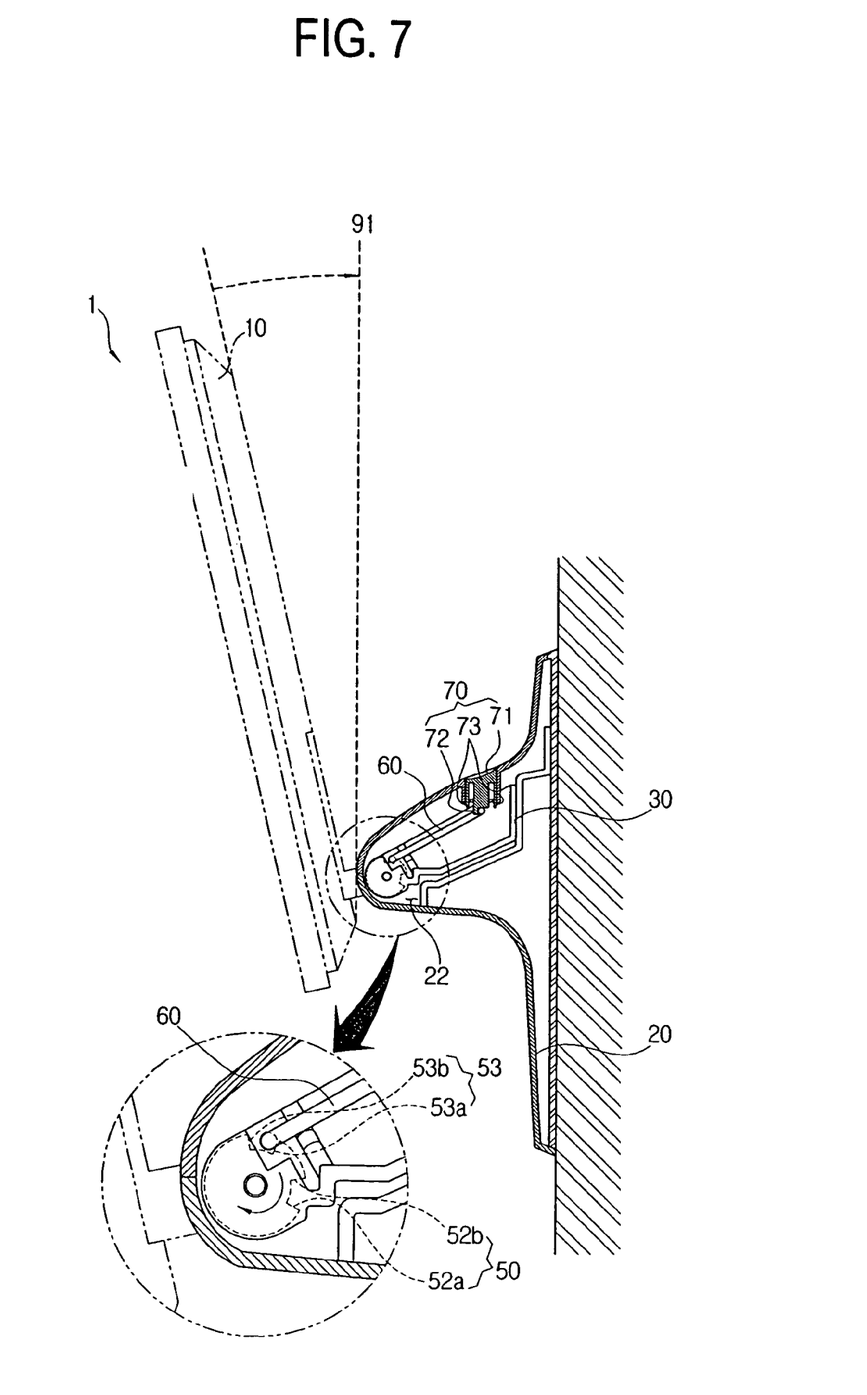
FIG. 7 is a lateral section view of the monitor main body of FIG. 4 on the way to the second tilting state at an angle of 10° about a stand.
Figure 8:
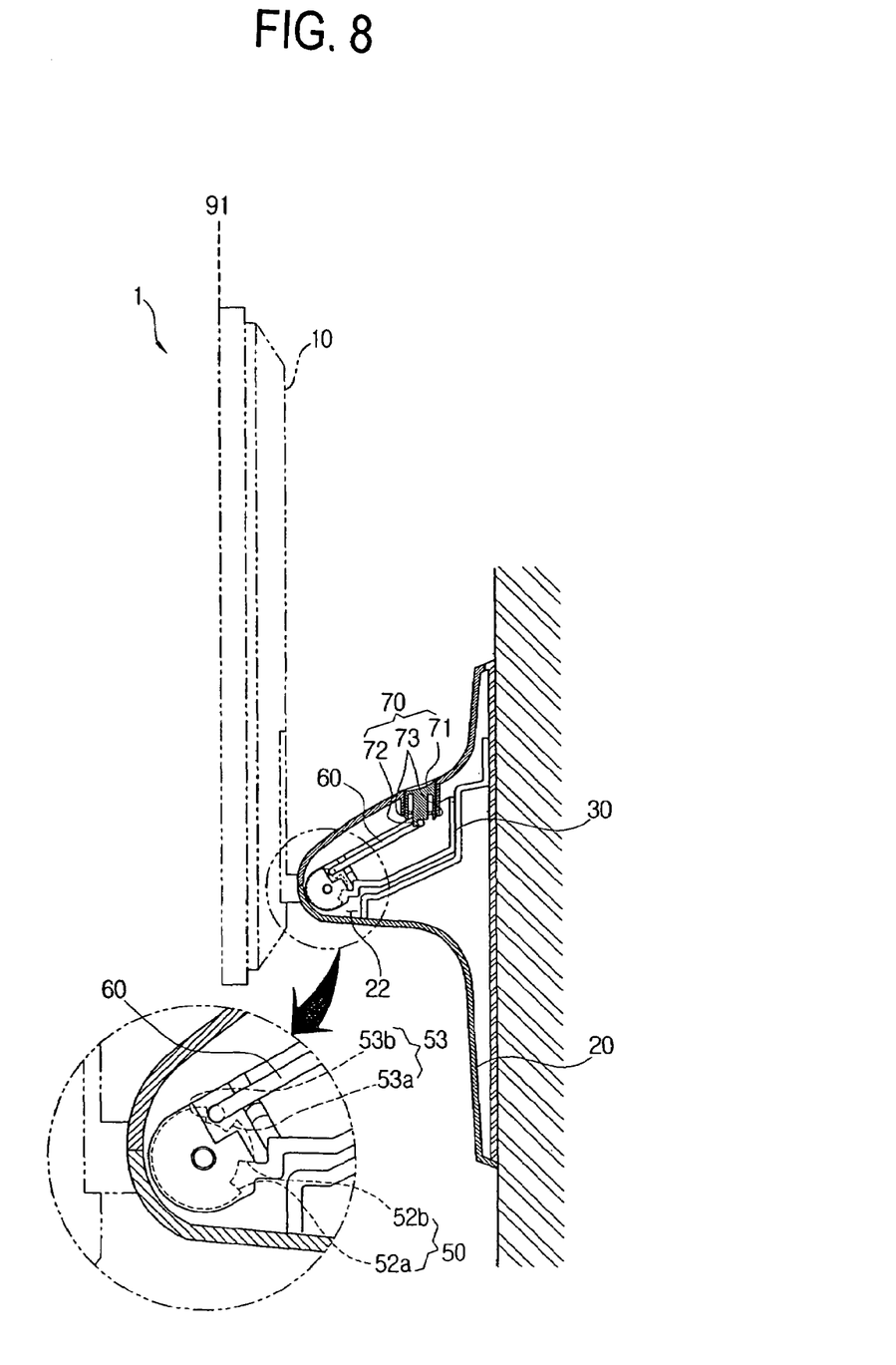
FIG. 8 is a lateral section view of the monitor main body of FIG. 4 tilted at an angle of 0° about the stand.

The second locker 53 comprises a third edge 53a and a fourth edge 53b, wherein the third and fourth edges 53a and 53b engage with the stopper 60 in the second tilting state and restrict the tinting angle of the monitor main body 10 within a range from 0° to 10° with respect to a second reference line 91. That is, as shown in FIG. 7, when the stopper 60 is in contact with the third edge 53a, the monitor main body 10 is tilted at an angle of 10° with respect to a second reference line 91. Further, as shown in FIG. 8, when the monitor main body 10 is tilted backward, the locking unit (rotatable washer) 50 rotates integrally with the monitor main body 10 with respect to the hinge shaft 41 until the fourth edge 53b contacts the stopper 60. At this time, the monitor main body 10 is tilted at an angle of 0° with respect to the second reference line 91.

While the monitor main body 10 is tilted from the standing state to the wall-mounting state, the stopper 60 slides toward the center of the link 30 between the first locker 52 and the second locker 53. Thus, the monitor main body 10 can be easily tilted about the stand 20 between the first tilting state and the second tilting state.

The stopper 60 comprises a connection portion 61 having a "U"-shape, provided inside the link 30, and partially contacting a stopper operator 70 (to be described later); and sliding portions 62 extended and outwardly bent from opposite ends of the connection portion 61 and sliding penetratingly through the link 30. The sliding portions 62 are preferably bent at right angles with respect to the opposite ends of the connection portion 61.

The sliding portions 62 are inserted in a sliding through hole 33 formed at opposite sides of the link 30, and the connection portion 61 is accommodated in the link 30.

Meanwhile, the monitor 1 further comprises the stopper operator 70 (see, for example, FIGS. 2 and 6A) provided on the cover 80 and facing the stopper 60, thereby operating the stopper 60 to slide toward the inside of the link 30 when the monitor main body 10 is tilted from the standing state to the wall-mounting state.

The stopper operator 70 is shaped like a button and inserted in an operator insertion hole 81 formed on the cover 80. The stopper operator 70 comprises a pushing portion 71 exposed to the outside of the cover 80, a stopper contacting portion 72 extending from the pushing portion 71 to the inside of the cover 80 and contact-supporting the connection portion 61 of the stopper 60, and a hook 73 preventing the stopper operator 70 from separating from the operator insertion hole 81. Thus, when the pushing portion 71 of the stopper operator 70 is pushed in a direction of "A", the connection portion 61 contacting the stopper contacting portion 72 moves in a direction of "C" along a slope portion 36, and therefore the sliding portions 62 slide through the sliding through hole 33 in a direction of "B" (refer to FIGS. 6A and 6B). At this time, the slope portion 36 is provided inside the link 30 and allows the stopper 60 to slide toward the inside of the link 30. That is, the inside of the link 30 is formed with a supporter 35 supporting the stopper 60, and the slope portion 36 sloping from the supporter 35 backward.

Figure 6A:
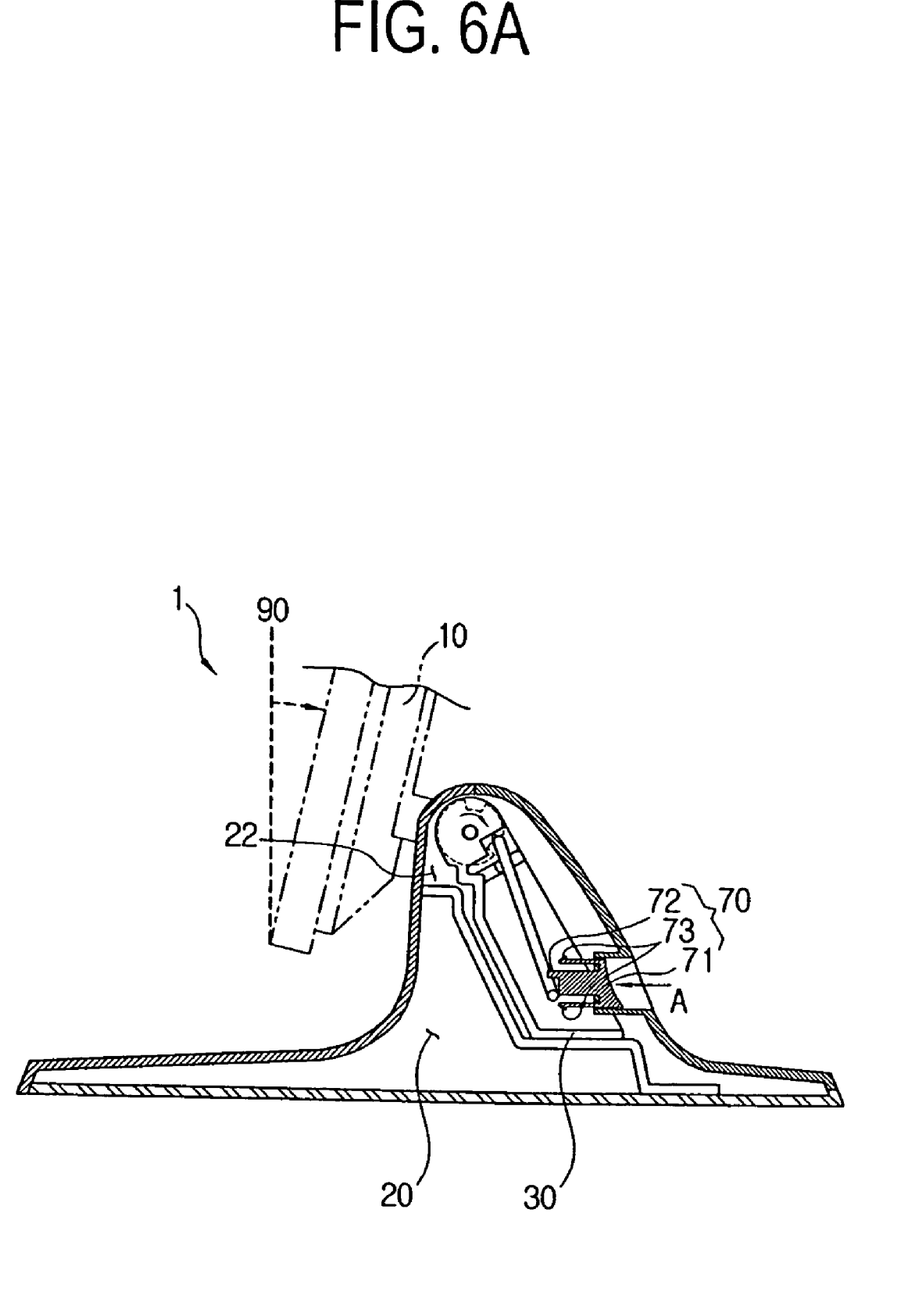
FIG. 6A is a partially enlarged lateral section view illustrating an operation of a stopper to tilt the monitor main body of FIG. 4 from the first tilting state to a second tilting state.
Figure 6B:
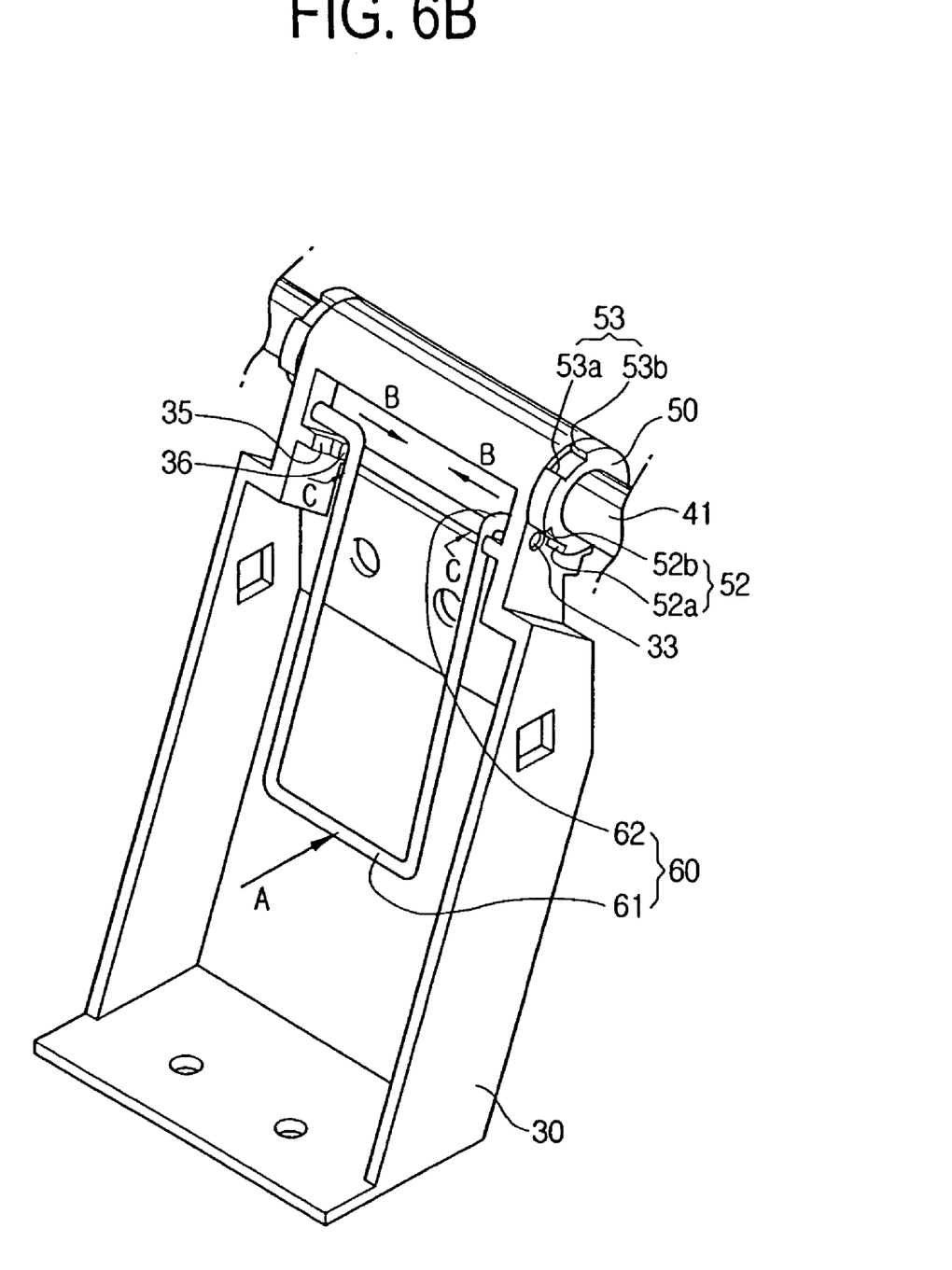
FIG. 6B is a perspective view illustrating the operation of the stopper in FIG. 6A.

The supporter 35 is used to push the connection portion 61 of the stopper 60 toward the stopper contacting portion 72 to contact the stopper contacting portion 72. Thus, the stopper 60 contacting the stopper contacting portion 72 is interlocked with the stopper operator 70. Further, when the stopper 60 is pushed by the stopper operator 70 in the direction of "A", the connection portion 61 moves in the direction of "C" along the slope portion 36, thereby allowing the sliding portion 62 to slide in the direction of "B".

With this configuration of the monitor 1 according to an embodiment of the present invention, the monitor main body 10 is tilted as follows.

Referring back to FIGS. 4 and 5, when the stopper 60 is in contact with the first edge 52a, the monitor main body 10 is tilted at an angle of 0° with respect to the first reference line 90. At this time, the monitor main body 10 is pressed and tilted backward, the locking unit (rotatable washer) 50 rotates about the hinge shaft 41 integrally with the monitor main body 10 until the stopper 60 contacts the second edge 52b. At this time, the monitor main body 10 is tilted at an angle of 13° with respect to the first reference line 90. Further, the connection portion 61 is in contact with the stopper contacting portion 72 by the supporter 35.

To tilt the monitor main body 10 from the first tilting state to the second tilting state, the pushing portion 71 of the stopper operator 70 is first pushed in the direction of "A" (see FIGS. 6A and 6B), so that the connection portion 61, contacting the stopper contacting portion 72, moves in the direction of "C" along the slope portion 36, and the sliding portion 62 moves in the direction of "B". Thus, the second edge 52b is released from the stopper 60. Then, the monitor main body 10 is pressed forward, so that the rotatable washer 50 rotates in contact with the stopper through hole 33. When the third edge 53a is aligned with the stopper through hole 33, the sliding portion 62 of the stopper 60 is resiliently restored toward the second locker 53 and locked to the second edge 52b. At this time, the monitor main body 10 is forward tilted at an angle of 10° with respect to the second reference line 91 (refer to FIG. 7). Further, when the monitor main body is more backwardly pressed, the locking unit (rotatable washer) 50 can rotate about the hinge shaft 41 integrally with the monitor main body 10 until the fourth edge 53b contacts the sliding portion 62 of the stopper 60. At this time, the monitor main body 10 is tilted at an angle of 0° with respect to the second reference line 91 (refer to FIG. 8).

In the foregoing embodiment, the first locker 52 and the second locker 53 are provided in the locking unit (rotatable washer) 50. However, the first locker and the second locker 53 may be provided in the hinge.

In the foregoing embodiment, the tilting angle of the monitor main body is restricted within a range from 0° to 13° in the first tilting state and a range from 0° to 10° in the second tilting state. However, the tilting angle of the monitor main body is not limited to the above range and may vary by changing the arc lengths of the first locker and second locker.

In the foregoing embodiment, the stopper 60 is interlocked with the stopper operator 70 shaped like a button and is manually operated to slide. However, the stopper may automatically slide by sensing the contact between the stopper and the locking unit.

As described above, the present invention provides a monitor, in which a stopper slides, so that a monitor main body is smoothly and easily tilted about a stand between a first tilting state and a second tilting state.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A monitor comprising a monitor main body, a stand supporting the monitor, and a link connecting the monitor main body with the stand, the monitor comprising:
    a hinge allowing the monitor main body to be tilted about the stand between a first tilting state such as a standing state and a second tilting state such as a wall-mounting state;
    a locking unit provided in the hinge, rotating integrally with the monitor main body, and comprising a first locker corresponding to the first tilting state and a second locker corresponding to the second tilting state; and
    a stopper coupled to the link, sliding within the first locker and the second locker, and restricting a tilting angle of the monitor main body by contacting the first locker and the second locker.

2. The monitor according to claim 1, wherein the locking unit comprises a rotatable washer coupled to the hinge and rotating integrally with the monitor main body, and the first and second lockers are grooved with predetermined lengths on the rotatable washer, respectively.

3. The monitor according to claim 2, further comprising a stopper operator provided in the stand, connected to the stopper, and operating the stopper to slide toward an inside of the link.

4. The monitor according to claim 3, wherein the stand comprises a link accommodating portion to accommodate the link; and a cover provided corresponding to the link accommodating portion, covering the link accommodating portion, and provided with the stopper operator.

5. The monitor according to claim 4, wherein the cover is formed with an operator insertion portion in which the stopper operator is inserted, and
    the stopper operator comprises:
    a pushing portion exposed to an outside of the cover;
    a stopper contacting portion extending from the pushing portion to an inside of the cover and partially contact-supporting the stopper; and
    a hook preventing the stopper operator from separating from the operator insertion portion.

6. The monitor according to claim 1, wherein the stopper comprises a connection portion provided inside the link and contacting the stopper operator, and a sliding portion outwardly bent from an end of the connection portion and sliding outside of the link.

7. The monitor according to claim 6, wherein the link comprises a sliding through portion at a lateral side thereof, and a supporter and a slope portion at the inside thereof, the sliding through portion allowing the sliding portion to slide therethrough; the supporter supporting the stopper; and the slope portion allowing the stopper to slide therealong.

8. The monitor according to claim 2, wherein the stopper comprises a connection portion provided inside the link and contacting the stopper operator, and a sliding portion outwardly bent from an end of the connection portion and sliding outside of the link.

9. The monitor according to claim 8, wherein the link comprises a sliding through portion at a lateral side thereof, and a supporter and a slope portion at the inside thereof, the sliding through portion allowing the sliding portion to slide therethrough; the supporter supporting the stopper; and the slope portion allowing the stopper to slide therealong.

10. The monitor according to claim 3, wherein the stopper comprises a connection portion provided inside the link and contacting the stopper operator, and a sliding portion outwardly bent from an end of the connection portion and sliding outside of the link.

11. The monitor according to claim 10, wherein the link comprises a sliding through portion at a lateral side thereof, and a supporter and a slope portion at the inside thereof, the sliding through portion allowing the sliding portion to slide therethrough; the supporter supporting the stopper; and the slope portion allowing the stopper to slide therealong.

12. The monitor according to claim 4, wherein the stopper comprises a connection portion provided inside the link and contacting the stopper operator, and a sliding portion outwardly bent from an end of the connection portion and sliding outside of the link.

13. The monitor according to claim 12, wherein the link comprises a sliding through portion at a lateral side thereof, and a supporter and a slope portion at the inside thereof, the sliding through portion allowing the sliding portion to slide therethrough; the supporter supporting the stopper; and the slope portion allowing the stopper to slide therealong.

14. The monitor according to claim 5, wherein the stopper comprises a connection portion provided inside the link and contacting the stopper operator, and a sliding portion outwardly bent from an end of the connection portion and sliding outside of the link.

15. The monitor according to claim 14, wherein the link comprises a sliding through portion at a lateral side thereof, and a supporter and a slope portion at the inside thereof, the sliding through portion allowing the sliding portion to slide therethrough; the supporter supporting the stopper; and the slope portion allowing the stopper to slide therealong.

16. A monitor apparatus, comprising:
a flat panel display;
a stand to support the display; and
a hinge unit connecting the stand to the display, the hinge unit including a rotating lock member provided on a first end of the hinge unit to lock the display at predetermined rotation angles with respect to the stand, the rotating lock member including a first locker member locking the display at a first rotation position with respect to the stand and a second locker member locking the display at a second position with respect to the stand, the second position being a rotation angle of approximately 90 degrees with respect to the first position;
wherein the stand comprises a stopper therein sliding into engagement with the first locker member to restrict the tilt angle of the display at a first angle, and sliding into engagement with the second locker member to restrict the tilt angle of the display at a second angle.

17. The monitor according to claim 16, further comprising a stopper operator extending through a back portion of the stand to allow the stopper to slide between engagement with the first locker member and the second locker member when pressed by a user while the display is rotated with respect to the stand.

18. The monitor according to claim 17, wherein the back portion of the stand comprises a removable cover provided with the stopper operator therein.

19. A monitor apparatus, comprising:
a flat panel display;
a stand to support the display; and
a hinge unit connecting the stand to the display, the hinge unit comprising a rotating lock member to rotate integrally with the display, the rotating lock member comprising a first locker member and a second locker member, the stand comprising a slidable stopper to slide into engagement with the first locker member and the second locker member to lock the display in a first display position and a second display position, respectively, the second display position being a rotation angle of approximately 90 degrees with respect to the first display position.

* * * * *